W. L. CLAUSE.
LEER.
APPLICATION FILED JUNE 15, 1912.
1,268,217.
Patented June 4, 1918.
2 SHEETS—SHEET 1.
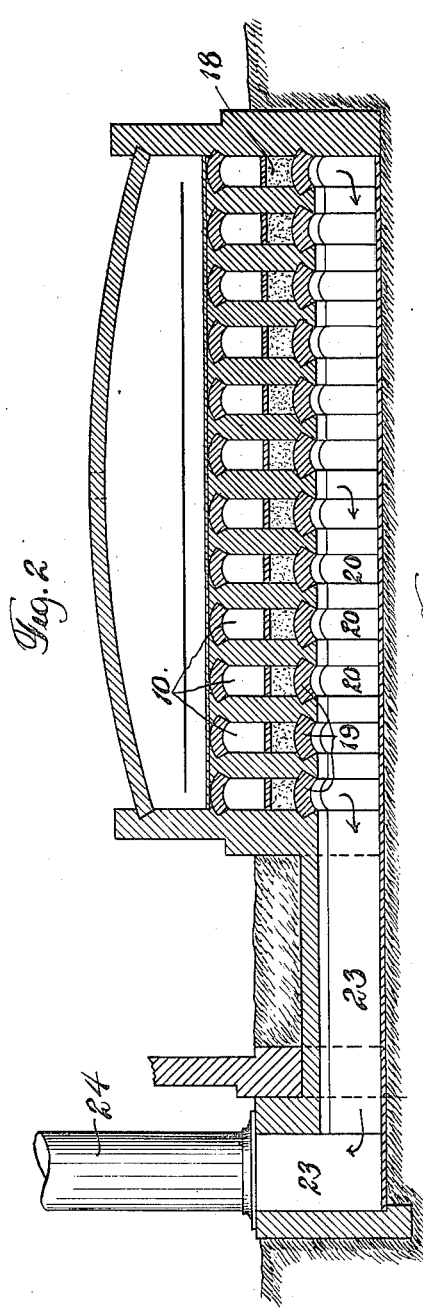
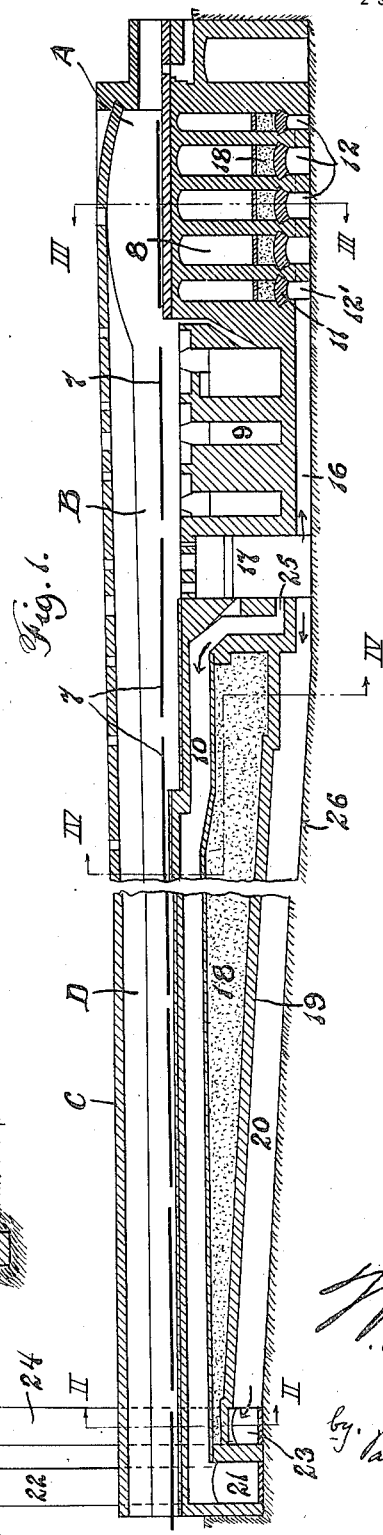
WITNESSES:
INVENTOR.
ATTORNEY.

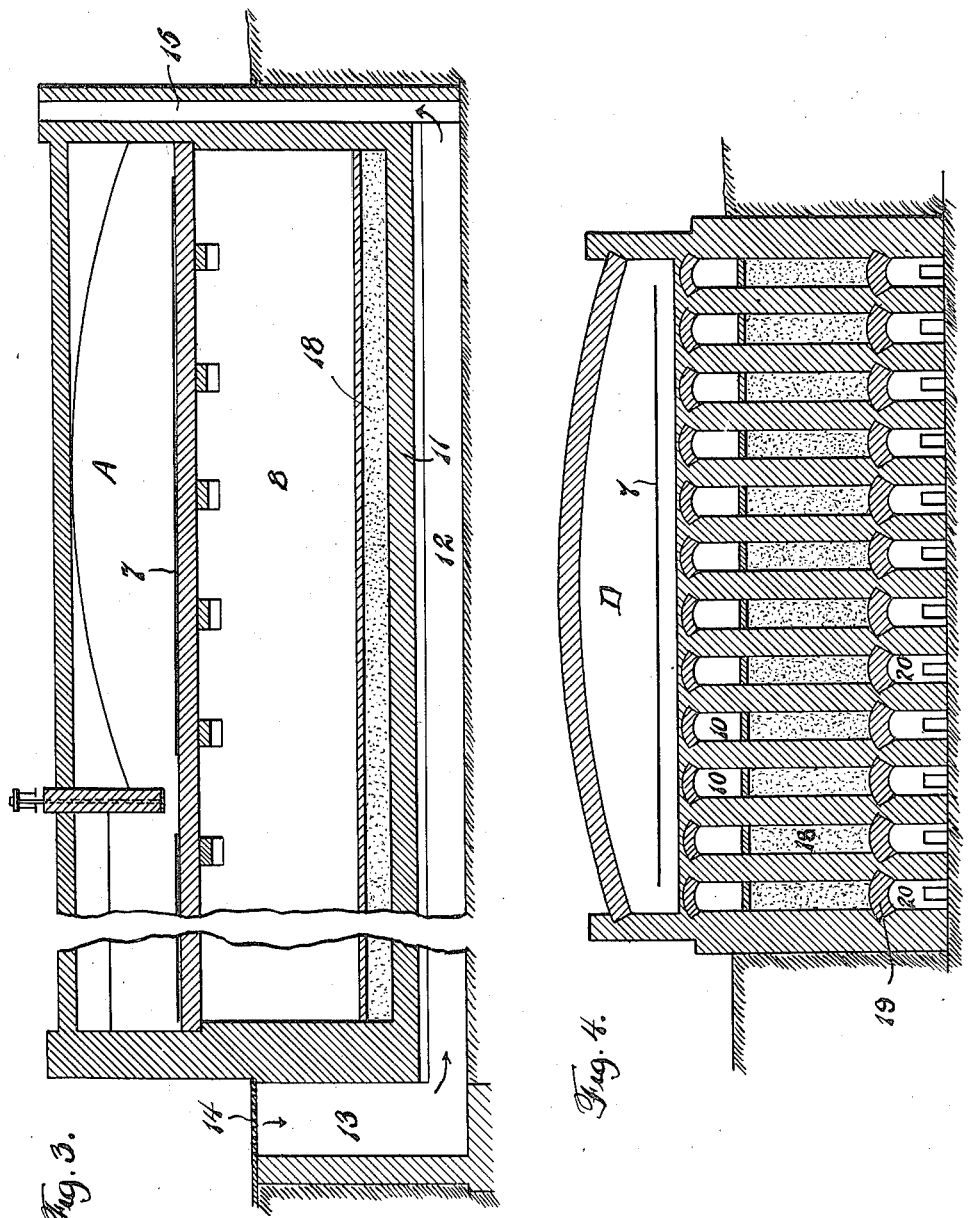

UNITED STATES PATENT OFFICE.

WILLIAM L. CLAUSE, OF PITTSBURGH, PENNSYLVANIA, ASSIGNOR TO PITTSBURGH PLATE GLASS COMPANY, A CORPORATION OF PENNSYLVANIA.

LEER.

1,268,217.   Specification of Letters Patent.   Patented June 4, 1918.

Application filed June 15, 1912. Serial No. 703,777.

*To all whom it may concern:*

Be it known that I, WILLIAM L. CLAUSE, a citizen of the United States, residing at Pittsburgh, in the county of Allegheny and State of Pennsylvania, have invented certain new and useful Improvements in Leers, of which the following is a specification.

This invention relates primarily to leers for the annealing of plate glass and it has for its principal objects the provision of means whereby sinking, cracking and other forms of distortion and breakage of the leer resulting from the heating of the supporting ground-work of the leer is prevented; and the provision of means for insulating the surface supporting the leer from the action of the heat. These, together with such other objects as may hereinafter appear or are incidental to the invention, I attain by means of a construction which I have illustrated in preferred form in the accompanying drawings, wherein—

Figure 1 is a longitudinal section through a leer embodying my invention; Fig. 2 is a section through the leer taken on the line II—II of Fig. 1; Fig. 3 is a section through the ovens of the leer taken on the line III—III of Fig. 1; and Fig. 4 is a section through the leer taken on the line IV—IV of Fig. 1.

It has been found that the heat employed in annealing the glass in the leer dries out or evaporates the moisture in the soil supporting the leer with the result that shrinkage and sinking of the soil and with it the foundations, occurs. This shrinkage and sinking is frequently irregular, particularly where the soil is composed largely of clay which contains a considerable portion of moisture, and the walls of the leer become distorted, cracked or sunk in portions, thus impairing the effectiveness of the apparatus. It is one of the chief objects of my invention to overcome this difficulty.

Referring now to Fig. 1 of the drawings, it will be seen that I have diagrammatically illustrated an annealing leer comprising an oven portion A, a portion B commonly designated as the lifting station and a portion C which is the leer proper and is provided with a chamber or runway D through which the plates of glass are gradually moved. The portion A is composed of a plurality of ovens arranged in steps at right angles to one another in the usual manner, and the plates of glass 7, diagrammatically shown in the drawing are transferred at the lifting station B to a step-by-step or intermittent conveyer mechanism (not shown) by which they are gradually transferred to the discharge end of the runway D. The temperature of the leer gradually decreases from the oven end to the discharge end thereof in the usual manner, the heat being supplied to the ovens, lifting station and runway by means of the series of heating flues 8, 9 and 10 respectively. The flue chambers of the ovens extend across the width of the ovens and are divided into an upper and lower compartment by means of the longitudinal arches 11, the upper compartments constituting the heating flues 8 and the lower compartments 12 constituting insulating flues. The insulating flues 12 open at one side of the leer into a chamber 13 which is preferably closed by a foraminous plate 14 and at the other side to venting stacks 15 built into the side wall of the leer, (see particularly Fig. 3). A plurality of insulating flues 16 are arranged longitudinally of the lifting station and open at one end into the chamber 17 which extends across the leer transversely of the lifting station, and at the other end to the first insulating flue 12' of the ovens. The chamber 17 is preferably open at the sides and the top. The heating flues 8 are partially filled with a heat storage material 18, such for example as broken brick and sand, in order to maintain uniformity of temperature.

The flue chambers under the runway extend longitudinally from a point adjacent the chamber 17 to the discharge end of the runway and are also divided into two compartments by longitudinally extending arches or bridge walls 19. The upper compartments are the heating flues 10 herein before referred to, and the lower compartments constitute insulating flues 20. The heating flues 10 open into a passage 21 which extends transversely across the discharge end of the runway and leads to a stack 22. These flues, like the flues 8 of the ovens, are partially filled with heat storage material 18, but it will be noted that the bridge walls 19 slope upwardly toward the discharge end of the leer and that the depth of the storage material decreases proportionately in order to secure proper graduation of the heat from the hot to the cooler portions of the runway.

The insulating flues 20 lead from the chamber 17 to the passage 23 which extends transversely of the runway and opens into a stack 24 (see particularly Figs. 1 and 2). These flues slope substantially at the same angle as the bridge walls. Heat is supplied to the heating flues 10 by means of burners at 25.

The purpose of the provision of the insulating flues 12, 16 and 20 is the protection of the surface of the supporting soil 26 from the action of the excessive heat in the ovens, lifting station and runway. The insulating effect is obtained in the following manner: When the air in the flues 12 and 16 becomes heated, it rises in the stacks 15 and a natural circulation of air is set up, cool air being drawn into the flues 12 from the chamber 13 and into the flues 16 from the chamber 17. A similar circulation is set up in the flues 20 under the runway, the cool air being drawn in from the chamber 17, which as before pointed out, is open at the sides, and the hot air being discharged from the stack 24. In this case, however, the circulation is greatly assisted by the upward slope given the flues. The course of the air currents is indicated by arrows. It will be apparent from the foregoing that the supporting surface of the soil will be insulated from the heat by comparatively cool air and that the drying out of the soil will be reduced to a minimum and sinking thereof prevented. It will be obvious that my invention will apply equally to leers adapted for other uses than the annealing of plate glass, and also that the improvement in its broader aspect is not limited to my particular arrangement of insulating flues. That is to say, the flues could also be arranged transversely, diagonally or otherwise, as well as longitudinally without materially impairing the insulating functions thereof.

Having thus described my invention and illustrated its use, what I claim as new and desire to secure by Letters Patent is the following:—

1. A leer comprising a leer chamber for the glass having a bottom wall supported above the ground by a plurality of vertical walls resting upon the ground spaced apart to permit the passage of air between them, conduits beneath the bottom wall for heating the leer chamber and a heat storing element beneath the conduit having its thickest portion adjacent the front end of the leer chamber and gradually diminishing in thickness toward the rear or discharge end of the leer chamber.

2. A leer comprising a leer chamber for the glass having a bottom wall supported above the ground by a plurality of vertical walls resting upon the ground spaced apart to permit the passage of air between them, conduits beneath the bottom wall for heating the leer chamber and a heat storing element beneath the conduits and spaced from the ground, having its thickest portion adjacent the front end of the leer chamber and gradually diminishing in thickness toward the rear or discharge end of the leer chamber.

3. A leer comprising a leer chamber for the glass having conduits beneath the bottom wall thereof for conducting heated gases, means for supporting the leer chamber above the ground and a heat absorbing element between the ground and the conduits spaced from the ground to provide passages for cool air beneath the heat absorbing element, the said element having its greatest thickness adjacent the front end of the leer and gradually diminishing in thickness toward the rear or discharge end of the leer.

4. A leer comprising a leer chamber for the glass having a substantially horizontal bottom supported above the ground, conduits beneath and parallel with the bottom for conducting heated gases, a heat absorbing element beneath the conduits having its greatest thickness adjacent the front end of the leer and diminishing in thickness toward the rear or discharge end of the leer, and means for supporting the said element above the ground to provide a space for cooled air to pass beneath the element and in contact with the ground.

In testimony whereof I have hereunto signed my name in the presence of the two subscribed witnesses.

W. L. CLAUSE.

Witnesses:
C. S. LAMB,
M. T. COCHRAN.